United States Patent
Miao et al.

(10) Patent No.: US 9,856,177 B2
(45) Date of Patent: Jan. 2, 2018

(54) CORDIERITE POROUS CERAMIC HONEYCOMB ARTICLES

(75) Inventors: Weiguo Miao, Horseheads, NY (US); Jianguo Wang, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 784 days.

(21) Appl. No.: 12/789,833

(22) Filed: May 28, 2010

(65) Prior Publication Data

US 2011/0293883 A1   Dec. 1, 2011

(51) Int. Cl.
*C04B 35/195* (2006.01)
*C04B 38/00* (2006.01)
(Continued)

(52) U.S. Cl.
CPC .......... *C04B 38/0006* (2013.01); *B01J 35/04* (2013.01); *C04B 35/195* (2013.01);
(Continued)

(58) Field of Classification Search
CPC .... B01D 2046/2437; B01D 2046/2496; B01D 46/2425; B01D 46/2444;
(Continued)

(56) References Cited

U.S. PATENT DOCUMENTS

| 4,329,162 A | 5/1982 | Pitcher, Jr. ...................... 55/523 |
| 4,557,773 A | 12/1985 | Bonzo .............................. 156/64 |

(Continued)

FOREIGN PATENT DOCUMENTS

| CN | 101316642 | 12/2008 |
| WO | 2006/068767 | 6/2006 |

(Continued)

OTHER PUBLICATIONS

U.S. Appl. No. 12/423,272, filed Apr. 14, 2009, Lu et al.
(Continued)

*Primary Examiner* — Humera Sheikh
*Assistant Examiner* — Lucas Wang
(74) *Attorney, Agent, or Firm* — Jakub M. Michna; Joseph M. Homa

(57) ABSTRACT

Porous ceramic honeycomb articles for use as particulate filters and processes for making the same are described herein. The porous ceramic honeycomb articles include a fired cordierite body. The fired cordierite body has a microcrack parameter ($Nb^3$) of about 0.05 to about 0.25 prior to exposure to a microcracking condition. After exposure to the microcracking condition, the fired cordierite body has a microcrack parameter ($Nb^3$) at least 20% greater than the microcrack parameter prior to exposure to the microcracking condition. The fired cordierite body has a coefficient of thermal expansion (CTE) of about $7.0 \times 10^{-7}/°$ C. to about $15.0 \times 10^{-7}/°$ C. over from about 25° C. to about 800° C. prior to exposure to the microcracking condition and a coefficient of thermal expansion of about $1.0 \times 10^{-7}/°$ C. to about $10.0 \times 10^{-7}/°$ C. over from about 25° C. to about 800° C. after exposure to the microcracking condition. The microcrack parameter may include a thermal cycle or a chemical treatment.

19 Claims, 6 Drawing Sheets

(51) Int. Cl.
*B01J 35/04* (2006.01)
*B01D 46/24* (2006.01)
*C04B 111/00* (2006.01)
*F01N 3/022* (2006.01)

(52) U.S. Cl.
CPC ...... *B01D 46/2425* (2013.01); *B01D 46/2444* (2013.01); *B01D 2046/2433* (2013.01); *B01D 2046/2437* (2013.01); *B01D 2046/2496* (2013.01); *C04B 2111/0081* (2013.01); *C04B 2111/00793* (2013.01); *F01N 3/0222* (2013.01); *F01N 2260/10* (2013.01); *Y10T 428/24149* (2015.01)

(58) Field of Classification Search
CPC ... C04B 2111/00793; C04B 2111/0081; F01N 2260/10; F01N 3/0222; Y10T 428/24149
USPC ................................................. 428/116–118
See application file for complete search history.

(56) References Cited

U.S. PATENT DOCUMENTS

| | | | |
|---|---|---|---|
| 4,573,896 A | 3/1986 | Bonzo | 425/125 |
| 5,069,697 A | 12/1991 | Hamaguchi et al. | 55/523 |
| 5,114,644 A | 5/1992 | Beall et al. | 264/63 |
| 5,185,110 A | 2/1993 | Hamaguchi et al. | 264/44 |
| 5,258,150 A | 11/1993 | Merkel et al. | 264/43 |
| 5,409,870 A | 4/1995 | Locker et al. | 501/119 |
| 5,549,725 A | 8/1996 | Kasai et al. | 55/523 |
| 5,567,663 A * | 10/1996 | Kotani | C04B 35/195 264/43 |
| 5,634,952 A | 6/1997 | Kasai et al. | 55/302 |
| 6,080,356 A | 6/2000 | Miura et al. | 264/631 |
| 6,101,793 A | 8/2000 | Nagai et al. | 55/523 |
| 6,210,626 B1 | 4/2001 | Cornelius et al. | 264/631 |
| 6,541,407 B2 | 4/2003 | Beall et al. | |
| 6,673,414 B2 | 1/2004 | Ketcham et al. | 428/116 |
| 6,696,132 B2 | 2/2004 | Beall et al. | 428/116 |
| 6,752,969 B1 | 6/2004 | Nishimura et al. | 422/180 |
| 6,773,481 B2 | 8/2004 | Noguchi et al. | 55/523 |
| 6,803,086 B2 | 10/2004 | Noguchi et al. | 428/116 |
| 6,809,139 B2 | 10/2004 | Fabian et al. | 524/430 |
| 6,814,774 B2 | 11/2004 | Ishihara et al. | 55/523 |
| 6,818,580 B2 | 11/2004 | Kumazawa et al. | 501/119 |
| 6,827,754 B2 | 12/2004 | Suwabe et al. | 55/523 |
| 6,843,822 B2 | 1/2005 | Beall et al. | 55/523 |
| 6,864,198 B2 | 3/2005 | Merkel | 501/80 |
| RE38,888 E | 11/2005 | Beall et al. | 501/119 |
| 7,122,612 B2 | 10/2006 | Tao et al. | 526/317.1 |
| 7,132,150 B2 | 11/2006 | Ogunwumi et al. | 428/116 |
| 7,138,003 B2 | 11/2006 | Ichikawa et al. | 55/523 |
| 7,141,087 B2 | 11/2006 | Noguchi et al. | 55/523 |
| 7,141,089 B2 | 11/2006 | Beall et al. | 55/523 |
| 7,166,555 B2 | 1/2007 | Shustack et al. | 502/174 |
| 7,179,316 B2 | 2/2007 | Merkel et al. | 55/523 |
| 7,179,516 B2 | 2/2007 | Ichikawa | 428/116 |
| 7,244,284 B2 | 7/2007 | Miwa et al. | 55/523 |
| 7,247,184 B2 | 7/2007 | Frost | 55/523 |
| 7,288,131 B2 | 10/2007 | Noguchi et al. | 55/523 |
| 7,309,371 B2 | 12/2007 | Merkel et al. | 55/523 |
| 7,341,614 B2 | 3/2008 | Hayashi et al. | 55/523 |
| 7,364,689 B2 | 4/2008 | Noguchi et al. | 264/630 |
| 7,431,880 B2 | 10/2008 | Watanabe et al. | 264/630 |
| 7,442,425 B2 | 10/2008 | Fu et al. | 428/117 |
| 7,445,745 B2 | 11/2008 | Peterson | 264/630 |
| 7,470,302 B2 | 12/2008 | Suzuki et al. | 55/523 |
| 7,473,392 B2 | 1/2009 | Wusirika | 264/631 |
| 7,481,962 B2 | 1/2009 | Kotani et al. | 264/631 |
| 7,485,170 B2 | 2/2009 | Beall et al. | 55/523 |
| 7,488,367 B2 | 2/2009 | Kasai et al. | 55/523 |
| 7,494,613 B2 | 2/2009 | Merkel et al. | 264/631 |
| 7,520,911 B2 | 4/2009 | Beall et al. | 55/523 |
| 7,575,618 B2 | 8/2009 | Miao et al. | 55/523 |
| 7,575,794 B2 | 8/2009 | Faber et al. | 428/116 |
| 7,618,699 B2 | 11/2009 | Beall et al. | 428/116 |
| 7,625,529 B2 | 12/2009 | Ohno et al. | 422/180 |
| 7,648,548 B2 | 1/2010 | Miao et al. | 55/523 |
| 7,648,550 B2 | 1/2010 | Beall et al. | 55/523 |
| 2005/0037147 A1 | 2/2005 | Ogunwumi et al. | |
| 2006/0272306 A1 | 12/2006 | Kirk et al. | |
| 2006/0290036 A1 | 12/2006 | Kaneda et al. | 264/628 |
| 2007/0039297 A1 | 2/2007 | Kawata et al. | 55/523 |
| 2007/0142208 A1 | 6/2007 | Addiego et al. | |
| 2007/0234694 A1 | 10/2007 | Miyairi et al. | 55/523 |
| 2007/0261378 A1 | 11/2007 | Miao et al. | 55/523 |
| 2007/0281127 A1 | 12/2007 | Backharicoult et al. | 428/116 |
| 2008/0032090 A1 | 2/2008 | Beall et al. | 428/116 |
| 2008/0032091 A1 | 2/2008 | Beall et al. | 428/116 |
| 2008/0047243 A1 | 2/2008 | Beall et al. | 55/523 |
| 2008/0057267 A1 | 3/2008 | Brocheton et al. | |
| 2008/0286179 A1 | 11/2008 | Liu et al. | |
| 2008/0315468 A1 | 12/2008 | Ono | 264/631 |
| 2009/0000260 A1 | 1/2009 | Liu et al. | 55/523 |
| 2009/0062105 A1 | 3/2009 | Custer et al. | 501/80 |
| 2009/0075022 A1 | 3/2009 | Sakamoto et al. | 428/118 |
| 2009/0087613 A1* | 4/2009 | Lu et al. | 428/117 |
| 2009/0130381 A1* | 5/2009 | Francois et al. | 428/117 |
| 2009/0137382 A1* | 5/2009 | Merkel | 502/60 |
| 2009/0142488 A1 | 6/2009 | Cutler et al. | 427/243 |
| 2009/0142541 A1 | 6/2009 | Glasson et al. | 428/116 |
| 2009/0202718 A1 | 8/2009 | Cutler et al. | 427/230 |
| 2009/0220733 A1* | 9/2009 | Backharicoult et al. | 428/116 |
| 2009/0220736 A1* | 9/2009 | Merkel | C04B 35/195 428/116 |
| 2009/0297764 A1* | 12/2009 | Beall et al. | 428/116 |
| 2010/0304082 A1* | 12/2010 | Merkel | 428/116 |
| 2011/0293883 A1 | 12/2011 | Miao et al. | |
| 2012/0134891 A1 | 5/2012 | Boger et al. | |
| 2012/0135186 A1 | 5/2012 | Beall et al. | |

FOREIGN PATENT DOCUMENTS

| | | |
|---|---|---|
| WO | 2009005679 A1 | 1/2009 |
| WO | 2009110974 | 9/2009 |

OTHER PUBLICATIONS

U.S. Appl. No. 12/423,317, filed Apr. 14, 2009, Lu et al.
Chinese application No. 201180026267.2, dated Sep. 29, 2013, "Notice on the First Office Action (PCT Application in the National Phase)", pp. 1-11.
Chinese application No. 201180026267.2, dated Feb. 20, 2014, "Notice on the Second Office Action", pp. 1-10.
Hasselman, D.P.H. and Singh, Jitendra P., Analysis of Thermal Stress Resistance of Microcracked Brittle Ceramics, The American Ceramic Society, Ceramic Bulletin, vol. 58, No. 9, pp. 856-860 (1979).
Case, E.D., Smyth, J.R. and Hunter, O., Grain-size dependence of microcrack initiation in brittle materials, Journal of Materials Science 15, pp. 149-153 (1980).
Dole, S.L., Hunter, Jr., O., Calderwood, F.W. and Bray, D.J., Microcracking of Monoclinic HfO2, Journal of The American Ceramic Society, vol. 61, No. 11-12, pp. 486-490 (1978).
Hutchinson, J. W., Crack Tip Schielding by Micro-Cracking in Brittle Solids, Acta metall, vol. 3, No. 7, pp. 1605-1619 (1987).
Budiansky, Bernard and O'Connell, Richard J., Elastic Moduli of a Cracked Solid, Int. J. Solids Structures, vol. 12, pp. 81-97 (1976).
Chinese Application No. 201180026267.2, Decision on Rejection, dated Oct. 21, 2014.
Japanese Patent Application No. 2013-513233, First Office Action, dated Dec. 2, 2014.
PCT International Application No. PCT/US2011/038030, International Preliminary Report on Patentability, dated Apr. 12, 2012.

* cited by examiner

CORDIERITE POROUS CERAMIC HONEYCOMB ARTICLES

RELATED APPLICATIONS

The present application is related to U.S. patent application Ser. No. 12/789,945 filed May 28, 2010, entitled "METHODS FOR FORMING CERAMIC HONEYCOMB ARTICLES", and which issued on May 10, 2016 as U.S. Pat. No. 9,334,191, the entirety of which is incorporated by reference herein.

BACKGROUND

Field

The present specification generally relates to porous ceramic honeycomb articles and, more specifically, to cordierite porous ceramic honeycomb articles for use as filter materials.

Technical Background

Ceramic honeycomb articles are widely used as anti-pollution devices in the exhaust systems of automotive vehicles, both as catalytic converter substrates in automobiles, and as particulate filters in diesel-powered vehicles. Ceramic honeycomb articles for use in such applications are formed from a matrix of thin, porous ceramic walls which define a plurality of parallel, gas conducting channels. In ceramic honeycomb articles used as catalytic substrates in automobiles with gasoline engines, the gas conducting channels are open at both ends. A catalytic coating is applied to the outer surfaces of the walls. Exhaust gasses flowing through the channels come into contact with catalytic coatings on the surfaces of the walls. These honeycomb articles are referred to as flow-through substrates. In diesel systems, exhaust gasses also come into contact with catalytic coatings on the surfaces of the walls. In diesel applications, the ceramic honeycomb articles also have end-plugs in alternate gas conducting channels to force exhaust gasses to pass through the porous channel walls in order to capture and filter out soot and ash particulates prior to exhaust discharge. These ceramic honeycomb substrates are referred to as ceramic wall-flow particulate filters and, more specifically, as diesel particulate filters. The extreme temperature fluctuations experienced by honeycomb articles used in both automotive and diesel applications makes the ceramic honeycomb articles susceptible to temperature-induced cracking which leads to the degradation of the honeycomb articles.

Accordingly, a need exists for alternative porous ceramic honeycomb articles which are less susceptible to thermally induced cracking and alternative methods for manufacturing the same.

SUMMARY

According to one embodiment, a porous ceramic honeycomb article includes a fired cordierite body which, prior to exposure to a microcracking condition, has a microcrack parameter ($Nb^3$) of about 0.05 to about 0.25. After exposure to a microcracking condition, the fired cordierite body has a microcrack parameter ($Nb^3$) which is at least 20% greater than the microcrack parameter of the cordierite body prior to exposure to the microcracking condition. Such a porous ceramic honeycomb article may be utilized to filter particulate matter in a vehicle exhaust stream.

In another embodiment, a porous ceramic honeycomb article includes a fired cordierite body which, prior to exposure to a microcracking condition, has a microcrack parameter ($Nb^3$) of about 0.05 to about 0.25, a coefficient of thermal expansion (CTE) of about $7.0 \times 10^{-7}/°$ C. to about $15.0 \times 10^{-7}/°$ C. from about 25° C. to about 800° C., and a $d_f$ of less than or equal to about 0.4, where $d_f = (d_{50} - d_{10})/d_{50}$. After exposure to the microcracking condition, the same fired cordierite body has a microcrack parameter ($Nb^3$) at least 20% greater than the microcrack parameter prior to exposure to the microcracking condition, a coefficient of thermal expansion (CTE) of about $1.0 \times 10^{-7}/°$ C. to about $10.0 \times 10^{-7}/°$ C. over from about 25° C. to about 800° C., and a $d_f$ of less than or equal to about 0.4.

In another embodiment, a porous ceramic honeycomb article includes a fired cordierite body which, prior to exposure to a microcracking condition, has a microcrack parameter ($Nb^3$) of about 0.05 to about 0.25, a coefficient of thermal expansion (CTE) of about $7.0 \times 10^{-7}/°$ C. to about $15.0 \times 10^{-7}/°$ C. over from about 25° C. to about 800° C., and a surface porosity of about 38% to about 45%. After exposure to the microcracking condition, the same fired cordierite body has a microcrack parameter ($Nb^3$) at least 20% greater than the microcrack parameter prior to exposure to the microcracking condition, a coefficient of thermal expansion (CTE) of about $1.0 \times 10^{-7}/°$ C. to about $10.0 \times 10^{-7}/°$ C. over from about 25° C. to about 800° C., and a surface porosity of about 38% to about 45%.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
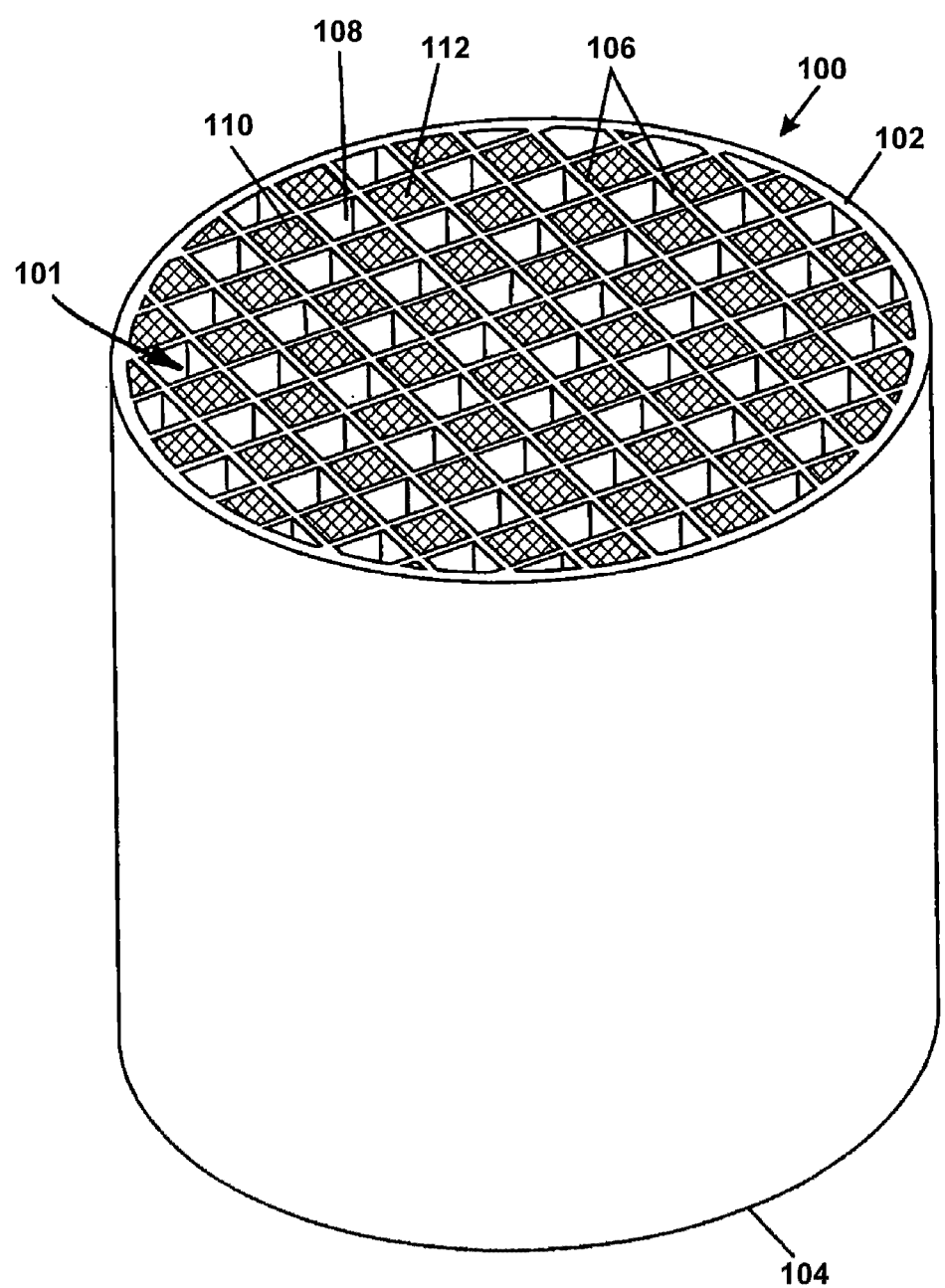
FIG. 1 schematically depicts a porous ceramic honeycomb article according to one or more embodiments shown and described herein.

Reference will now be made in detail to embodiments of porous ceramic honeycomb articles, examples of which are illustrated in the accompanying drawings. Whenever possible, the same reference numerals will be used throughout the drawings to refer to the same or like parts. One embodiment of a porous ceramic honeycomb article is schematically depicted in FIG. 1. The porous ceramic honeycomb article is constructed from a cordierite ceramic material which exhibits a relatively low microcrack parameter $Nb^3$, a relatively high CTE over the temperature range from about 25° C. to 800° C. after firing and prior to exposure to a microcracking condition, and a relatively low thermal shock limit (TSL). After the porous ceramic honeycomb article is exposed to a microcracking condition, the microcrack parameter of the porous ceramic honeycomb article is increased by at least 20%, the CTE of the porous ceramic honeycomb article is decreased over the temperature range from about 25° C. to 800° C., and the TSL of the porous ceramic article is increased. The porous ceramic honeycomb articles described herein may be washcoated without the use of a preliminary passivation coating. The porous ceramic honeycomb articles and methods for making the porous ceramic honeycomb articles will be described in more detail herein.

As used herein, the singular forms "a," "an" and "the" include plural referents unless the context clearly dictates otherwise. Thus, for example, reference to a "silica-forming source" or an "alumina-forming source" may include aspects of having two or more such forming sources, unless the context clearly indicates otherwise.

As used herein, a "wt. %" or "weight percent" or "percent by weight" of an organic component, unless specifically stated to the contrary, is based on the total weight of the total inorganics in which the component is included. All organic additions, such as, for example, pore formers and binders, are specified herein as superadditions based upon 100% of the inorganics used.

As briefly discussed above, it has been found that filters made from cordierite porous ceramic honeycomb articles described herein have a relatively high CTE over the temperature range from about 25° C. to 800° C. and a corresponding low thermal shock limit (TSL) after firing. However, following exposure to a microcracking condition, the porous ceramic cordierite honeycomb articles described herein have a relatively lower CTE over the temperature range from about 25° C. to 800° C. and a relatively higher thermal shock limit (TSL). It should be understood that CTE, as used herein, is the coefficient of thermal expansion in at least one direction of the article over the specified temperature range, unless otherwise specified. The improvement in the CTE and TSL following exposure to the microcracking condition, is due to the increase in the volume of microcracks following exposure to the microcracking condition as indicated by an increase in the microcrack parameter $Nb^3$ following exposure to the microcracking condition. More specifically, the microcrack parameter $Nb^3$ of the porous ceramic honeycomb articles increases by at least 20 percent after the article is exposed to a microcracking condition.

The microcrack parameter $Nb^3$ is derived from the modulus of elasticity ($E_{mod}$) heating curve to 1200° C. and is an indirect measure of the microcrack volume of the article. $Nb^3$ is calculated as:

$$Nb^3 = \frac{\left[\frac{E_0}{E} - 1\right]}{1.8},$$

where E is the elastic modulus of the article at room temperature with microcracks, $E_0$ is the theoretical elastic modulus of the article at room temperature without microcracks, N is the number of microcracks and b is the average length of a microcrack. The microcrack parameter $Nb^3$ is measured in units of volume given that the average crack length b, is cubed.

Thermal Shock Limit (TSL), as used herein, is defined as:

TSL=TSP+500° C., where TSP is the Thermal Shock Parameter such that:

TSP=MOR/$\{[E_{mod}][CTE_H]\}$ and $E_{mod}$ is the elastic modulus of the article at 25° C. (i.e., room temperature (RT)), MOR is the modulus of rupture strength at room temperature and is measured in psi, and $CTE_H$ is the high temperature thermal expansion coefficient measured between 500° C. and 900° C. As the TSP increases, the ability of the article to withstand thermal gradients also increases. MOR, $E_{mod}$, and $CTE_H$ are all measured on a cellular specimen parallel to the length of the channels which is referred to herein as the axial direction. MOR was measured using the four point bend method in the axial direction of a rectangular cellular bar having dimensions of 4×1×0.5 inches.

Referring now to FIG. 1, a porous ceramic honeycomb article 100 is schematically depicted. The porous ceramic honeycomb article 100 may be used as a wall-flow filter for particulate matter filtration. For example, the porous ceramic honeycomb article 100 may be used in filtering particulate matter from a vehicle exhaust. The porous ceramic honeycomb articles 100 generally comprise a porous cordierite ceramic honeycomb body having a plurality of cell channels 101 extending between a first end 102 and a second end 104. The honeycomb structure of the article 100 may include the plurality of generally parallel cell channels 101 formed by, and at least partially defined by, intersecting porous cell walls 106 (sometimes referred to as "webs") that extend from the first end 102 to the second end 104. The porous ceramic honeycomb article 100 may also include a skin formed about and surrounding the plurality of cell channels. This skin may be extruded during the formation of the cell walls 106 or formed in later processing as an after-applied skin, by applying a skinning cement to the outer peripheral portion of the cells.

In one embodiment, the cellular honeycomb structure comprises a plurality of parallel cell channels 101 which are generally square in cross section and are formed into a honeycomb structure. However, in alternative embodiments, the plurality of parallel cell channels in the honeycomb structure may have other cross-sectional configurations, including rectangular, round, oblong, triangular, octagonal, hexagonal, or combinations thereof. Additionally, the cells may include larger inlet cells than outlet cells as described in U.S. Pat. Nos. 6,696,132, 6,843,822 or 7,247,184, for example.

The term "honeycomb" as used herein is defined as a structure of longitudinally-extending cells formed from cell walls 106, preferably having a generally repeating grid pattern therein. For honeycombs utilized in such filter applications, certain cells are designated as inlet cells 108 and certain other cells are designated as outlet cells 110. Moreover, in a porous ceramic honeycomb article 100, at least some of the cells may be plugged with plugs 112. Generally, the plugs 112 are arranged at or near the ends of the cell channels and are arranged in some defined pattern, such as in the checkerboard pattern shown in FIG. 1, with every other cell being plugged at an end. The inlet channels 108 may be plugged at or near the second end 104, and the outlet channels 110 may be plugged at or near the first end 102 on channels not corresponding to the inlet channels. Accordingly, each cell may be plugged at or near one end of the porous ceramic honeycomb article only.

In one embodiment (not shown), the partially formed (truncated) cells adjacent the skin may all be plugged at one or even both ends or even all along the length thereof. When a cell channel is plugged, the plug may be formed with a cement paste having the same or a similar composition as the material forming the porous ceramic honeycomb article 100, as described in U.S. Pat. Nos. 4,329,162, 6,809,139, or U.S. Pat. App. Pub. No. 2007/0272306, for example. The plugging process forms plugs 112 typically having a depth in the range of about 5 mm to about 20 mm, although this depth may vary and may include different depths at different parts of the filter. Processes suitable for plugging a porous ceramic honeycomb article are described in U.S. Pat. Nos. 4,557,773, 4,573,896 or WO 2006/068767, for example.

While FIG. 1 generally depicts a checkerboard plugging pattern, it should be understood that alternative plugging patterns may be used in the porous ceramic honeycomb article. For example, alternative plugging patterns suitable for use with a porous ceramic honeycomb article are described in U.S. Pat. No. 6,673,414. In another embodiment, some of the cell channels of the porous ceramic honeycomb may be plugged other than at the ends of the porous ceramic honeycomb, as described in U.S. Pat. No. 6,673,414.

Figure 2:
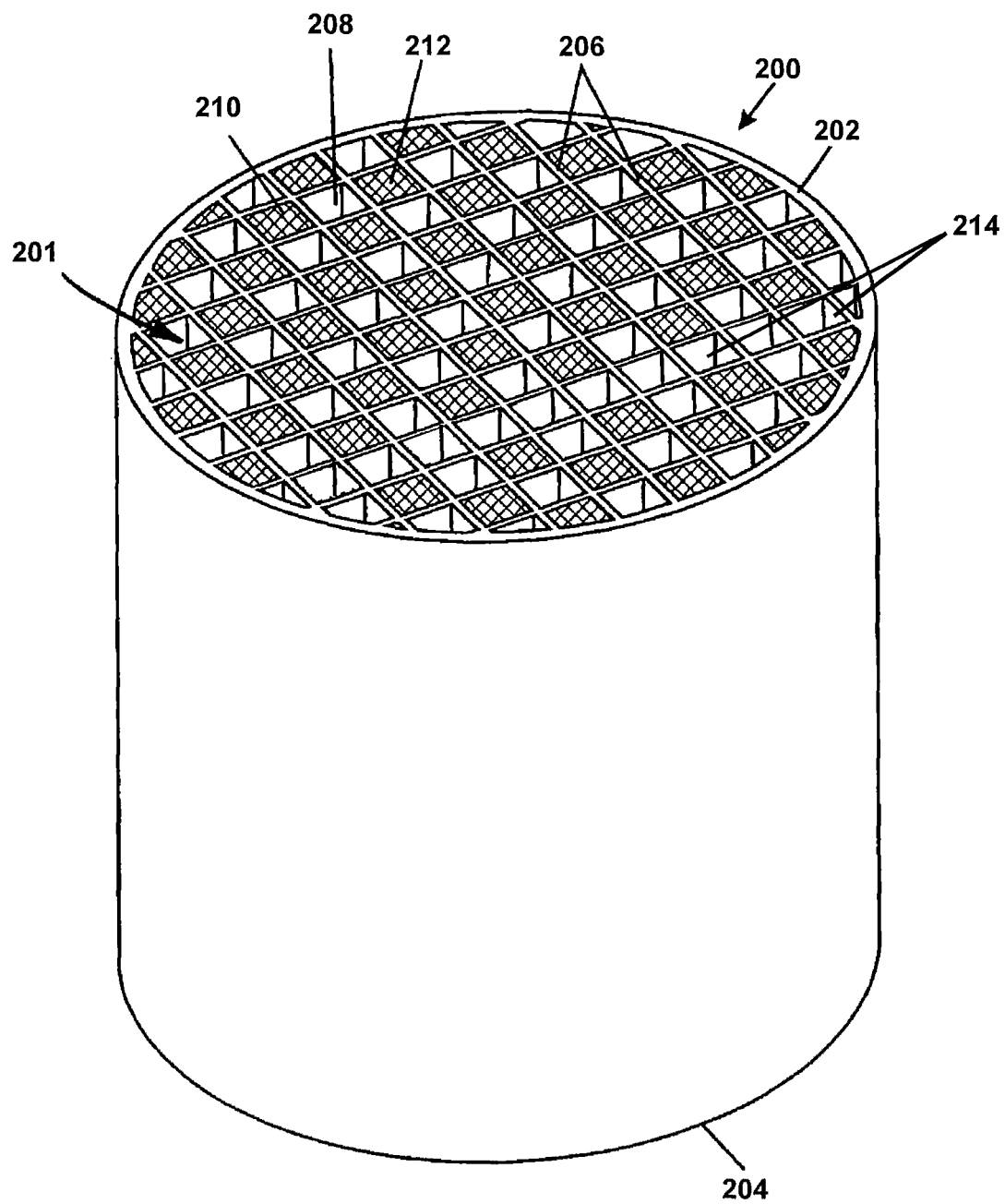
FIG. 2 schematically depicts a porous ceramic honeycomb article according to one or more embodiments shown and described herein.

Referring now to FIG. 2, an alternative embodiment of a porous ceramic honeycomb article 200 is schematically depicted. In this embodiment, some cell channels may be flow-through channels (unplugged along their entire length) while other channels may be plugged thus providing a so-called "partial filter" design. More specifically, the porous ceramic honeycomb article depicted in FIG. 2 generally comprises intersecting porous walls 206, inlet cells 208 plugged with plugs (not shown) at the outlet end 204, outlet cells 210 plugged with plugs 212 at the inlet end and at least some flow through (unplugged) channels 214 where flow passes directly through the body of the porous ceramic honeycomb article without passing through the porous cell walls 206. For example, in one embodiment (not shown), every other cell in every other row is a flow through channel. Thus, in this embodiment, less than 50% of the channels may be unplugged.

While FIGS. 1 and 2 depict embodiments of porous ceramic honeycomb articles 100, 200 in which some or all of the channels are plugged, is should be understood that, in alternative embodiments, all the channels of the porous ceramic honeycomb articles may be unplugged, such as when the porous ceramic honeycomb articles 100, 200 are used as catalytic through-flow substrates for use with gasoline engines.

In one embodiment of the porous ceramic honeycomb articles 100, 200 described herein, the thickness of the cell walls 106, 206 may be less than or equal to about 12 mils (305 microns). In another embodiment, the thickness of the cell walls 106, 206 may be less than or equal to about 10 mils (254 microns). In another embodiment, the thickness of the cell walls 106, 206 may be greater than or equal to about 4 mils (101.6 microns).

The cellular density of the porous ceramic honeycomb articles 100, 200 may be less than or equal to about 400 cells/in$^2$. In another embodiment, the cellular density of the porous ceramic honeycomb articles 100, 200 may be less than or equal to about 300 cells/in$^2$. In yet another embodiment, the cellular density of the porous ceramic honeycomb articles 100, 200 may be less than or equal to about 200 cells/in$^2$ and greater than or equal to about 50 cells/in$^2$. Accordingly, in the embodiments described herein, it should be understood that the cellular density of the porous ceramic honeycomb articles 100, 200 may be greater than or equal to about 50 cells/in and less than or equal to about 400 cells/in$^2$.

Reference may be made herein to the porous ceramic honeycomb article having a "geometry" of A/B where A is the cellular density of the porous ceramic honeycomb article and B is the thickness of the cell walls. By way of example and not limitation, a porous ceramic honeycomb article having a 200/10 geometry has a cellular density of 200 cells/in$^2$ and a cell wall thickness of 10 mils.

As described hereinabove, the porous ceramic honeycomb articles described herein have a set of physical properties (i.e., CTE, TSL, Nb$^3$, etc.) which change when the porous ceramic honeycomb articles are exposed to a microcracking condition thereby producing a porous ceramic honeycomb article which has an improved resistance to thermal shock.

Figure 3:
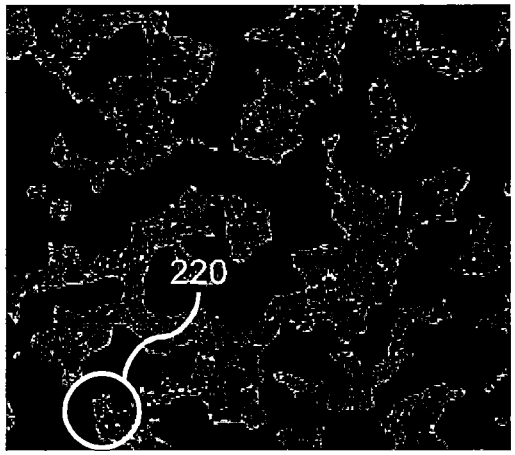
FIG. 3. is an SEM micrograph of a fired porous ceramic honeycomb article prior to exposure to a microcracking condition according to one or more embodiments shown and described herein.
Figure 4:
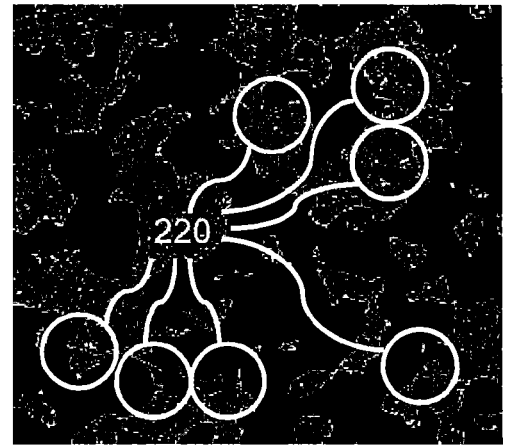
FIG. 4 is an SEM micrograph of a fired porous ceramic honeycomb article after exposure to a microcracking condition according to one or more embodiments shown and described herein.

Referring to FIGS. 3 and 4, the porous ceramic honeycomb articles described herein are formed by first mixing a cordierite precursor batch composition, forming the cordierite precursor batch composition into a green honeycomb article, drying the green honeycomb article and firing the green honeycomb article under conditions suitable to initially produce a low microcracked (LMC) porous ceramic honeycomb article. FIG. 3 is an SEM micrograph depicting a portion of a LMC porous ceramic honeycomb article with very few microcracks 220 (one indicated in FIG. 3). Thereafter, the LMC porous ceramic honeycomb article is exposed to a microcracking condition to produce a more highly microcracked porous ceramic honeycomb article which has greater microcrack parameter Nb$^3$, a lower CTE and a greater Thermal Shock Limit than the LMC porous ceramic honeycomb article. FIG. 4 is an SEM micrograph depicting a portion of a microcracked (MC) porous ceramic honeycomb article which is produced by exposing an LMC porous ceramic honeycomb article to a microcracking condition. Following exposure to a microcracking condition, the now-microcracked porous ceramic honeycomb article has a relatively greater number of microcracks 220 (a plurality of which are indicated in FIG. 4) than the LMC porous ceramic honeycomb article (i.e., the number of microcracks 220 in FIG. 4 is greater than the number of microcracks 220 in FIG. 3.)

In one embodiment, after the green honeycomb article is fired to produce the LMC porous ceramic honeycomb article, the LMC porous ceramic honeycomb article may be washcoated with a catalyst-containing washcoat prior to being exposed to the microcracking condition. Because the LMC porous ceramic honeycomb article has relatively few microcracks, a separate passivation coating is not needed prior to application of the washcoat.

Methods for forming the porous ceramic honeycomb articles will now be described in more detail.

In one embodiment, the cordierite precursor batch composition comprises a combination of constituent materials suitable for producing a ceramic article which predominately comprises a cordierite crystalline phase. In general the batch composition comprises a combination of inorganic components including a relatively fine talc, a relatively fine silica-forming source, and an alumina-forming source. In still other embodiments the batch composition may comprise clay, such as, for example, kaolin clay. The cordierite precursor batch composition may also contain organic components such as organic pore formers. For example, the batch composition may comprise various starches which are suitable for use as pore formers and/or other processing aids.

In the embodiments described herein, the inorganic batch components and the organic batch components are selected in conjunction with a specific firing cycle so as to yield a porous ceramic honeycomb article comprising a predominant cordierite crystalline phase and a specific microstructure which will be described in more detail herein. However, it should be understood that, after firing, the porous ceramic honeycomb article may also include small amounts of mullite, spinel, and/or mixtures thereof. For example, and without limitation, in one embodiment, the fired porous ceramic honeycomb article may comprise at least 90% by weight, or even at least 95% by weight, or even at least 98%-99% by weight of a cordierite crystalline phase, as measured by x-ray diffraction. The cordierite crystalline phase produced consists essentially of, as characterized in an oxide weight percent basis, from about 49% to about 53% by weight $SiO_2$, from about 33% to about 38% by weight $Al_2O_3$, and from about 12% to about 16% by weight MgO. Moreover, the cordierite crystalline phase stoichiometry approximates $Mg_2Al_4Si_5O_{18}$. The inorganic cordierite precursor batch composition may be appropriately adjusted to achieve the aforementioned oxide weights within the cordierite crystalline phase of the fired porous ceramic honeycomb article.

In some embodiments described herein, the cordierite precursor batch compositions comprise from about 35% to about 45% by weight of talc. In other embodiments, the cordierite precursor batch composition may comprise from about 38% to about 43% by weight of talc. The talc may have a relatively fine particle size. For example, in some embodiments, the talc has a median particle diameter $d_{pt50}$ of less than or equal to 10 microns, or even a $d_{pt50}$ of less than or equal to 9 microns. In other embodiments, the talc has a median particle diameter $d_{pt50}$ less than 8 microns or even a $d_{pt50}$ less than 6 microns. In still other embodiments the talc may have a median particle size $d_{pt50}$ of less than 5 microns. In one exemplary embodiment, the talc has a median particle size $d_{pt50}$ in the range from about 3 microns to about 10 microns. In another exemplary embodiment, the talc has a median particle size $d_{pt50}$ in the range from about 8 microns to about 10 microns. All particle sizes described herein are measured by a particle size distribution (PSD) technique, preferably by a Sedigraph by Micrometrics.

In some embodiments, the amount of the silica-forming source in the cordierite precursor batch composition is from about 13% to about 24% by weight. In other embodiments, the amount of the silica-forming source in the cordierite precursor batch composition may be from about 15% to about 18% by weight. The silica-forming source generally has a fine particle size. For example, in some embodiments, the silica-forming source has a median particle diameter $d_{ps50}$ of less than or equal to 20 microns, or even a $d_{ps50}$ of less than or equal to 15 microns. In other embodiments, the silica-forming source has a median particle diameter $d_{ps50}$ less than 10 microns. In one embodiment, the silica-forming source is a microcrystalline silica such as Imsil® A-25. However, it should be understood that other silica-forming sources may be used. For example, other suitable silica-forming sources include fused silica; colloidal silica; or crystalline silica such as quartz or crystobalite.

In some embodiments, the amount of the alumina-forming source in the cordierite precursor batch composition is from about 20% to about 35% by weight while in other embodiments the amount of the alumina-forming source in the cordierite precursor batch composition is from about 22% to about 33% by weight. In still other embodiments the amount of the alumina forming source in the cordierite precursor batch composition is from about 26% to about 29% by weight. The alumina-forming source generally has a fine particle size. For example, in some embodiments, the alumina-forming source has a median particle diameter $d_{pa50}$ of less than or equal to 10 microns, or even a $d_{pa50}$ of less than or equal to 8 microns. In other embodiments, the silica-forming source has a median particle diameter $d_{pa50}$ less than 6 microns.

Exemplary alumina-forming sources may include any aluminum oxide or a compound containing aluminum which, when heated to sufficiently high temperature, yields essentially 100% aluminum oxide, such as alpha-alumina and/or hydrated alumina. Further non-limiting examples of alumina-forming sources include corundum, gamma-alumina, or transitional aluminas. The aluminum hydroxide may comprise gibbsite and bayerite, boehmite, diaspore, aluminum isopropoxide, and the like. If desired, the alumina-forming source may also comprise a dispersible alumina-forming source. As used herein, a dispersible alumina-forming source is one that is at least substantially dispersible in a solvent or liquid medium and that can be used to provide a colloidal suspension in a solvent or liquid medium. In one aspect, a dispersible alumina-forming source can be a relatively high surface area alumina source having a specific surface area of at least 20 m$^2$/g, at least 50 m$^2$/g, or even at least 100 m$^2$/g. A suitable dispersible alumina source comprises alpha aluminum oxide hydroxide (AlOOH.x.H$_2$O) commonly referred to as boehmite, pseudoboehmite, and as aluminum monohydrate. In alternative embodiments, the dispersible alumina source can comprise the so-called transition or activated aluminas (i.e., aluminum oxyhydroxide and chi, eta, rho, iota, kappa, gamma, delta, and theta alumina) which can contain various amounts of chemically bound water or hydroxyl functionalities.

In some embodiments, the cordierite precursor batch composition may further comprise clay. The amount of clay in the cordierite precursor batch composition may be from about 0% to about 20% by weight. In another embodiment, the amount of clay in the cordierite precursor batch composition is from about 10% to about 18% by weight or even from about 12% to about 16% by weight. When included in the cordierite batch composition, the clay generally has a median particle size $d_{pc50}$ of less than or equal to 10 microns. In some embodiments, the median particle size $d_{pc50}$ is less than or equal to 5 microns or even less than or equal to 3 microns. Suitable clays which may be included in the cordierite precursor batch composition include, without limitation, raw kaolin clay, calcined kaolin clay, and/or mixtures thereof. Exemplary and non-limiting clays include non-delaminated kaolinite raw clay and delaminated kaolinite.

As described herein above, the cordierite precursor batch composition further comprises organic components such as relatively fine pore formers. Pore formers are fugitive particulate material which is vaporized by combustion during drying and heating of the green ceramic body leaving behind a larger porosity than would otherwise be obtained. In the embodiments described herein, the cordierite precursor batch composition may comprise from about 10% to about 35% by weight of an organic pore former. In the embodiments described herein the organic pore formers generally have a median particle size $d_{pp50}$ less than or equal to 20 microns. In some embodiments, the organic pore formers have a median particle size $d_{pp50}$ less than or equal to 15 microns or even a median particle size $d_{pp50}$ less than or equal to 10 microns. The organic pore formers may be cross-linked pore formers (i.e., cross-linked starches and the like) or un-cross-linked pore formers. Examples of suitable pore formers include, without limitation, cross-linked corn starch, cross-linked wheat starch, cross-linked potato starch, un-cross-linked potato starch, un-cross-linked corn starch and/or various combinations thereof.

The inorganic and organic components described above are combined and mixed together with processing aids such as, for example, a binder, and a liquid vehicle, to create a plasticized batch mixture. These processing aids may improve processing and/or reduce drying and/or firing cracking and/or aid in producing desirable properties in the honeycomb article. For example, the binder can include an organic binder. Suitable organic binders include water soluble cellulose ether binders such as methylcellulose, hydroxypropyl methylcellulose, methylcellulose derivatives, hydroxyethyl acrylate, polyvinylalcohol, and/or any combinations thereof. Preferably, the organic binder is present in the composition as a super addition in an amount in the range of from 0.1% to about 10.0% by weight of the inorganic powder batch composition. In another embodiment, the organic binder can be present in the composition as a super addition in an amount in the range of from 2.0% to 8.0% by weight of the inorganic powder batch composition. Incorporation of the organic binder into the plasticized batch composition allows the plasticized batch composition to be readily extruded.

One liquid vehicle for providing a flowable or paste-like consistency to the batch composition is water, although it should be understood that other liquid vehicles exhibiting solvent action with respect to suitable temporary organic binders can be used. The amount of the liquid vehicle component can vary in order to impart optimum handling properties and compatibility with the other components in the batch composition. In some embodiments, the liquid vehicle content is present as a super addition in an amount in the range from 20% to 50% by weight, and in other embodiments in the range from 20% to 35% by weight. Minimization of liquid components in the batch composition can lead to further reductions in undesired drying shrinkage and crack formation during the drying process.

In addition to the liquid vehicle and binder, the plasticized batch composition may include one or more optional forming or processing aids such as, for example, a lubricant. Exemplary lubricants can include tall oil, sodium stearate or other suitable lubricants. The amount of lubricant present in the plasticized batch mixture may be from about 0.5% by weight to about 10% be weight.

It should be understood that the liquid vehicle, pore formers, binders, lubricants and any other processing aids included in the batch composition are added to the batch composition as super additions based upon the weight % of 100% of the inorganic materials.

The combination of inorganic batch components, pore formers, binders, the liquid vehicle, lubricants and any other additives are mixed together in a Littleford mixer and kneaded for approximately 5-20 minutes to produce a plasticized batch composition having the desired plastic formability and green strength to permit the plasticized batch composition to be shaped into a honeycomb article.

The resulting plasticized cordierite precursor batch composition is then shaped into a green body (i.e., a green honeycomb article) by conventional ceramic forming processes, such as, for example, extrusion. When the green honeycomb article is formed by extrusion, the extrusion can be performed using a hydraulic ram extrusion press, or alternatively, a two stage de-airing single auger extruder, or a twin screw mixer with a die assembly attached to the discharge end.

After the plasticized cordierite precursor batch composition has been formed into a green honeycomb article, the green honeycomb article is dried to remove excess liquid from the green honeycomb article. Suitable drying techniques include microwave drying, hot air drying, RF drying or various combinations thereof. After drying, the green honeycomb article is placed in a kiln or furnace and fired under conditions effective to convert the green honeycomb article into a ceramic honeycomb article comprising a primary cordierite crystalline phase, as described herein.

It should be understood that the firing conditions utilized to convert the green honeycomb body into a ceramic honeycomb article can vary depending on the process conditions such as, for example, the specific composition, size of the green honeycomb body, and nature of the equipment used. To that end, in one aspect, the optimal firing conditions specified herein may need to be adapted (i.e., slowed down) for very large cordierite structures, for example.

The firing schedules utilized to produce porous ceramic honeycomb articles having the properties described herein may ramp quickly from 1200° C. to a maximum hold temperature at or above 1420° C., or even at or above 1425° C. The quick ramp rate should be 50° C./hr or higher. In one embodiment, the ramp rate is 75° C./hr or higher. In one embodiment, the green honeycomb bodies may be held at the maximum temperature (i.e., the soak temperature) for 5 to 20 hours. In another embodiment the green honeycomb bodies may be held at the soak temperature from about 10 hours to about 15 hours. In another embodiment, the green honeycomb bodies can be fired at a soak temperature in the range of from about 1420° C. to about 1435° C. In yet another embodiment, the green body may be fired at a soak temperature in the range of from about 1425° C. to about 1435° C. In one embodiment, the firing cycle includes a quick ramp rate of 50° C./hr or higher from about 1200° C. and a soak temperature in the range from about 1420° C. to about 1435° C. for a sufficient time to form the cordierite crystalline phase in the fired body.

The total firing time may range from approximately 40 to 250 hours, largely depending on the size of the honeycomb article fired, during which time a maximum soak temperature is reached and held for a sufficient time as described above. In one embodiment, the firing schedule includes ramping from 1200° C. at a rate above 50° C./hour and firing at a soak temperature of between about 1425° C. and 1435° C. for between about 10 hours to about 15 hours.

Figure 10:
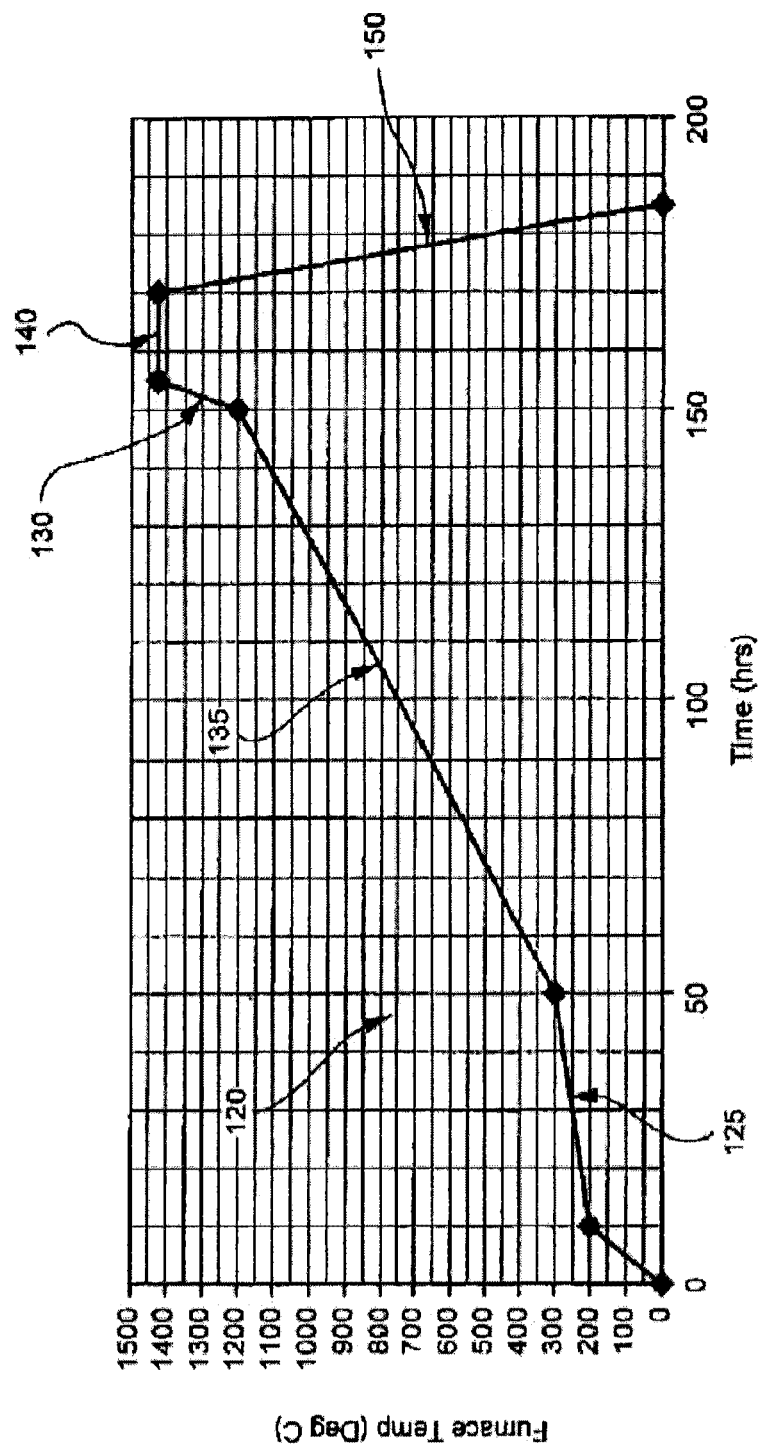
FIG. 10 graphically depicts an exemplary firing schedule for producing a porous ceramic honeycomb body according to one or more embodiments shown and described herein.

Referring now to FIG. 10, one embodiment of a firing schedule utilized to produce porous ceramic honeycomb articles having the properties described herein is graphically illustrated. In this embodiment, an average firing rate may be employed in the first firing portion 120 of the firing schedule. The average firing rate is between about 20° C./hour and about 70° C./hour between room temp and about 1200° C. The first portion 120 of the firing schedule may include a pore former burnout stage 125 which may be a hold or slight ramp within the range of pore former burnout temperatures to minimize cracking and temperature differentials between the skin and the core of the honeycomb. In one embodiment, the burnout stage 125 may be followed by an intermediate ramp 135 to about 1200° C. The upper portion 130 of the firing schedule includes a relatively faster ramp rate at temperatures above 1200° C. This fast ramp in the upper portion 130 may be coupled with a hold portion 140 at a temperature above 1420° C., or even at or above 1425° C., and preferably between 1420° C. and 1435° C. The cordierite crystalline phase of the porous honeycomb ceramic article is formed during this hold portion 140. The ramp rate in the upper portion 130 of the firing cycle may be 50° C./hour or more, 75° C./hour or more, 100° C./hour or more, or even 120° C./hour or more. By utilizing the faster ramp rate in the upper portion 130 above about 1200° C. and the relatively high hold temperature (above 1420° C.), unique microstructure characteristics of the fired ceramic body may be achieved, as will be described in more detail herein.

In particular, the firing cycle described herein aids in reducing the relative amount of fine porosity present in the fired ceramic honeycomb article to below about 4.0 microns. The reduction mechanism is thought to be from the promotion of viscous flow of the cordierite forming components such that fine pores are filled by the viscous flow of the components during the initial formation of the cordierite phase. Following the fast ramp, the honeycomb is held at the soak temperature for a suitable time, such as 5 to 20 hours, to form the cordierite phase. After this, the honeycomb article is cooled to room temperature in portion 150 of the firing schedule. The cooling rate is slow enough to prevent cracking and is dependent on the size of the part fired.

Referring to FIG. 3, the aforementioned firing schedule in conjunction with the aforementioned cordierite precursor batch compositions produce a porous ceramic honeycomb article which has a relatively low amount of microcracking and specific microstructural characteristics. The fired porous ceramic honeycomb article may be alternatively referred to herein as a low-microcracked (LMC) porous ceramic honeycomb article. In the embodiments described herein, the LMC porous ceramic honeycomb articles have a microcrack parameter $Nb^3$ from about 0.05 to about 0.25 after firing and prior to exposure to a microcracking condition. Low microcrack parameters in the range of 0.05 to about 0.25 generally correspond to a porous ceramic honeycomb article with very few microcracks 220, as depicted in FIG. 3. In one embodiment, the LMC porous ceramic honeycomb articles have a CTE from about $7.0 \times 10^{-7}$/° C. to about $15 \times 10^{-7}$/° C. or even from about $8.0 \times 10^{-7}$/° C. to about $13 \times 10^{-7}$/° C. In another embodiment, the LMC porous ceramic honeycomb articles have a CTE from about $9.0 \times 10^{-7}$/° C. to about $12 \times 10^{-7}$/° C. Due to the relatively low microcrack parameter $Nb^3$, LMC porous ceramic honeycomb articles have a Thermal Shock Limits (TSL) which, in the embodiments of the LMC porous ceramic honeycomb articles described herein, is in the range from about 800° C. to about 1100° C. In the embodiments described herein, the LMC porous ceramic honeycomb articles have a modulus of rupture (MOR) of greater than 300 psi or even greater than 400 psi at room temperature. In one embodiment, the MOR of the LMC porous ceramic honeycomb articles is greater than about 500 psi.

LMC porous ceramic honeycomb articles made as described herein and having a 200/10 geometry (i.e., 200 cells/in² and a wall thickness of 10 mils) generally have a modulus of elasticity ($E_{mod}$) at room temperature of greater than or equal to $3.0 \times 10^5$ psi or even greater than $4.5 \times 10^5$ psi. In one embodiment, the modulus of elasticity of the LMC porous ceramic honeycomb articles is in the range from about $3.0 \times 10^5$ psi to about $5.5 \times 10^5$ psi. Based on the MOR and $E_{mod}$, embodiments of the LMC porous ceramic honeycomb articles have a strain tolerance (i.e., MOR/$E_{mod}$) of at least 700 ppm. Other embodiments have a strain tolerance of greater than or equal to 800 ppm, or even greater than 1000 ppm. In yet other embodiments the LMC porous ceramic honeycomb articles have strain tolerance greater than or equal to 1200 ppm.

In some embodiments described herein, the LMC porous ceramic honeycomb articles are washcoated with a washcoat. For example, a slurry of a particulate washcoating composition can be applied to the surfaces (both internal and external) of the LMC porous ceramic honeycomb article. In some embodiments, the primary particulate component of the washcoating slurry is alumina. However, it should be understood that, in other embodiments, the washcoating slurry may comprise a different primary particulate component. In some embodiments, the washcoating slurry may additionally comprise a particulate catalyst such as, by way of example and not limitation, platinum, palladium, rhodium, or any other catalytic material and/or various alloys thereof. In embodiments where the washcoating slurry does not contain a particulate catalyst, the washcoating layer formed on and in the LMC porous ceramic honeycomb article can act as a catalyst support layer. Alternatively, when the washcoating slurry does not contain a separate particulate catalyst, the washcoating layer itself may act as a catalytic layer.

In one embodiment, the washcoating slurry is introduced into the LMC porous ceramic honeycomb article as a vacuum is drawn on the article and, in particular, on the walls of the article. The sub-atmospheric pressure exerted by the vacuum pulls the slurry of the washcoating composition through the pores in the walls of the LMC porous ceramic honeycomb article such that the washcoating composition is deposited on the surfaces of the walls and the pores of the LMC porous ceramic honeycomb article. Because the LMC porous ceramic honeycomb article contains relatively few microcracks per unit volume (i.e., because the microcrack parameter $Nb^3$ is from about 0.05 to about 0.25), it is not necessary to apply a preliminary passivation coating to the porous ceramic honeycomb article to prevent the washcoating material from becoming lodged in the microcracks, as is the case for more highly microcracked articles.

While some embodiments of the LMC porous ceramic honeycomb article may be coated with a washcoat prior to exposure to a microcracking condition, it should be understood that the step of washcoating the LMC porous ceramic honeycomb article is optional and that, in other embodiments, the LMC porous ceramic honeycomb article may be exposed to a microcracking condition without first being washcoated.

Following application of the washcoat to the LMC porous ceramic honeycomb article, the article is exposed to a microcracking condition which increases the number of microcracks per unit volume in the porous ceramic article (i.e., the microcracking condition increases the microcrack parameter $Nb^3$) as pictorially illustrated in FIGS. 3 (pre-microcracking condition) and 4 (post-microcracking condition). More specifically, it has been found that increasing the number of microcracks per unit volume in the article decreases the CTE of the article while increasing the Thermal Shock Limit (TSL) as well as the Thermal Shocking Parameter (TSP) of the porous ceramic honeycomb articles. Lowering the CTE and increasing the TSL and TSP produces a porous ceramic article that is less prone to cracking failure when exposed to large thermal gradients, such as the large thermal gradients which the porous ceramic article may be exposed to when used as a particulate filter in automotive and diesel applications. Moreover, microcracking the porous ceramic article after a washcoating has been applied to the porous ceramic article eliminates the need to use a passivation coating prior to the application of the washcoating because the number of microcracks per unit volume of the LMC porous ceramic honeycomb articles which may become filled by the washcoating slurry is relatively low.

In one embodiment, the microcracking condition is a thermal cycle. In this embodiment, the LMC porous ceramic article is heated to a peak temperature and then rapidly cooled. The heating and rapid cooling causes the LMC porous ceramic article to expand and contract thereby causing microcracks to nucleate and grow in the porous ceramic article. In some embodiments, the peak temperature of the thermal cycle is greater than or equal to about 400° C. or even greater than or equal to about 600° C. In general, the peak temperature of the thermal cycle is in the range from about 400° C. to about 800° C. After heating to the peak temperature, the porous ceramic honeycomb article is rapidly cooled at a rate of at least 200° C./hr during which time microcracks are formed throughout the volume of the porous ceramic honeycomb article. By exposing the LMC porous ceramic honeycomb article to the thermal cycle, the LMC porous ceramic honeycomb article becomes a microcracked (MC) porous ceramic honeycomb article.

In another embodiment, the microcracking condition is an acid wash. In this embodiment, the LMC porous ceramic honeycomb article is immersed in an acid solution which precipitates the nucleation and growth of microcracks throughout the honeycomb article. For example, in some embodiments the LMC porous ceramic honeycomb article may be immersed in a solution having a pH of less than 6 or even less than 5 to cause further microcracking in the honeycomb article. By exposing the LMC porous ceramic honeycomb article to the acidic solution, the LMC porous ceramic honeycomb article becomes a microcracked (MC) porous ceramic honeycomb article.

As a result of being exposed to the microcracking condition, the microcrack parameter $Nb^3$ of the MC porous ceramic honeycomb article is at least 20% higher than the microcrack parameter of the LMC porous ceramic honeycomb article thus indicating that the MC porous ceramic honeycomb articles has more microcracks per unit volume than the LMC porous ceramic honeycomb articles. For example, the microcrack parameter $Nb^3$ of the MC porous ceramic honeycomb articles may be in the range from at least 0.06 to at least 0.3. The increase in the microcracking parameter $Nb^3$ is accompanied by a decrease in the CTE of the article relative to the LMC porous ceramic honeycomb articles. For example, the CTE of the MC porous ceramic honeycomb articles is generally in the range from about $1.0 \times 10^{-7}/°$ C. to about $10 \times 10^{-7}/°$ C. over the range of from about 25° C. to about 800° C. In some embodiments, the CTE of the MC porous ceramic honeycomb articles is less than or equal to about $7.0 \times 10^{-7}/°$ C. over the range of from about 25° C. to about 800° C. or even less than or equal to about $5.0 \times 10^{-7}/°$ C. over the range of from about 25° C. to about 800° C. The increase in $Nb^3$ is accompanied by an increase in the TSL of the porous ceramic honeycomb articles. For example, the TSL of the MC porous ceramic honeycomb articles is greater than or equal to 900° C. or even greater than or equal to 1000° C. In some embodiments, the TSL of the MC porous ceramic honeycomb articles is greater than or equal 1100° C.

While exposure to the microcracking condition generally increases the microcrack parameter $Nb^3$ and the TSL of the MC porous ceramic honeycomb articles, the increase in the number of microcracks per unit volume generally decreases the modulus of rupture (MOR) at room temperature as well as the modulus of elasticity at room temperature ($E_{mod}$) compared to the LMC porous ceramic honeycomb articles. Accordingly, in the embodiments described herein, the MOR of the MC porous ceramic honeycomb article is greater than or equal to about 200 psi or even greater than about 300 psi. The $E_{mod}$ of the MC porous ceramic honeycomb article is generally in the range from about $2.8 \times 10^5$ psi to about $4.4 \times 10^5$ psi for a MC porous ceramic honeycomb article having a 200/10 geometry. In some embodiments, the $E_{mod}$ of the MC porous ceramic honeycomb article may be greater than or equal to $2.8 \times 10^5$ psi for a 200/10 geometry.

The microstructure of both the LMC porous ceramic honeycomb articles and the MC porous ceramic honeycomb articles (collectively, the fired porous ceramic honeycomb articles) will now be described in more detail, including such characteristics as the total porosity and the surface porosity as well as specific quantities related to the pore size distribution including $d_f$, $d_b$, $d_{90}$, $d_{50}$ and $d_{10}$. It should be understood that exposure to the microcracking condition does not significantly alter the microstructure of the LMC porous ceramic honeycomb articles. Accordingly, reference to a fired porous ceramic honeycomb article having a specific value for the total porosity, surface porosity and/or specific quantities related to the pore size distribution including, $d_f$, $d_b$, $d_{90}$, $d_{50}$ and $d_{10}$ should be understood to mean that the fired porous ceramic article has such a value both before and after exposure to the microcracking condition, unless otherwise specified herein.

Figure 5:
FIG. 5 is an SEM micrograph of a polished axial cross section through the body of a fired porous ceramic honeycomb article at 50× magnification according to one or more embodiments shown and described herein.
Figure 6:
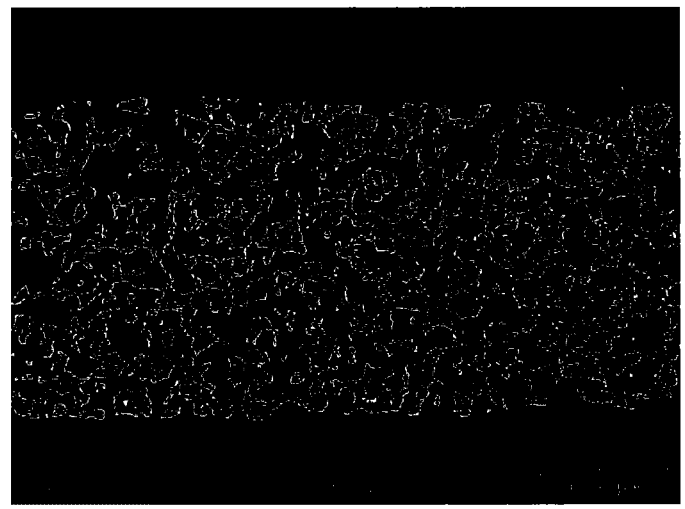
FIG. 6 is an SEM micrograph of a polished axial cross section through the body of a fired porous ceramic honeycomb article at 250× magnification according to one or more embodiments shown and described herein.

Referring now to the SEM micrographs of an axial cross section of a fired porous ceramic honeycomb article depicted in FIGS. 5 and 6 and made in accordance with the methods described herein, the fired porous ceramic honeycomb article generally has a relatively high total porosity (% P). In the embodiments of the fired porous ceramic honeycomb articles described herein, the total porosity % P is greater than or equal to about 50% and less than or equal to about 70% as measured with mercury porosimetry. As shown in FIGS. 5 and 6, the pores of the fired porous ceramic honeycomb article are highly connected within the channel-like domains of cordierite ceramic indicating an interpenetrated network structure. In the embodiments described herein the cordierite domain size is generally greater than or equal to about 20 microns or even 40 microns. In some embodiments the cordierite domain size is greater than 60 microns. In other embodiments, the cordierite domain size within the porous ceramic honeycomb article is in the range from about 20 microns to about 80 microns.

Figure 7:
FIG. 7 is an SEM micrograph of a surface of a fired porous ceramic honeycomb article at 50× magnification according to one or more embodiments shown and described herein.
Figure 8:
FIG. 8 is an SEM micrograph of a surface of a fired porous ceramic honeycomb article at 250× magnification according to one or more embodiments shown and described herein.
Figure 9:
FIG. 9 is an SEM micrograph of a surface of a fired porous ceramic honeycomb article at 500× magnification according to one or more embodiments shown and described herein.

Referring now to the SEM micrographs in FIGS. 7-9, the surface porosity of a surface of a fired porous ceramic honeycomb article produced according to the methods described herein is depicted at different magnifications. Embodiments of the fired porous ceramic honeycomb article generally have a high number of pores per square centimeter. In some embodiments, the number or pores is in the range from about 3000 pores/cm$^3$ to about 6000 pores/cm$^3$ without any pores larger than 50 microns. As shown in FIGS. 7-9, the as-fired surface pore morphology is similar to the pore morphology of the axial cross section shown in FIGS. 5-6. More specifically, the pores are generally well connected in channels. Accordingly, the morphology of the surface porosity taken in conjunction with the morphology of the total body porosity can be defined as a bi-continuous morphology.

Still referring to FIGS. 7-9, the surface porosity of the fired porous ceramic honeycomb articles, as measured by image analysis of SEM micrographs, is generally greater than or equal to 30% or even greater than or equal to 35%. In some embodiments, the surface porosity of the fired porous ceramic honeycomb articles is greater than or equal to 38% and may be in the range from about 38% to about 45%. The higher surface porosity yields a fired porous ceramic honeycomb article with a higher permeability and a corresponding lower backpressure drop when used as a particulate filter in automotive and/or diesel applications. Based on the surface porosity and the total porosity, embodiments of the fired porous ceramic honeycomb articles have a surface porosity to total porosity ratio of greater than or equal to 0.5 or even greater than or equal to 0.6. In some embodiments the surface porosity to total porosity ratio is greater than or equal to 0.7.

Utilizing the cordierite precursor batch compositions described herein in conjunction with the firing schedule described above yields a fired porous ceramic honeycomb article with a median pore diameter $d_{50}$ in the range from about 7 microns to about 16 microns or even 8 microns to about 14 microns. In some embodiments, the median pore diameter $d_{50}$ of the fired porous ceramic honeycomb article is in the range from about 10 microns to about 13 microns. Controlling the porosity such that the median pore diameter $d_{50}$ is within these ranges limits the amount of very small pores and thereby minimizes the washcoated backpressure of the fired porous ceramic article.

In the embodiments described herein, the pore size distribution of the fired porous ceramic honeycomb article comprises a $d_{10}$ value of greater than or equal to 5 microns or even greater than or equal to 8 microns. The quantity $d_{10}$, as used herein, is the pore diameter at which 10% of the pore volume is comprised of pores whose diameters are smaller than the value of $d_{10}$; thus, using mercury porosimetry techniques to measure porosity, $d_{10}$ is equal to the pore diameter at which 90% by volume of the open porosity of the ceramic has been intruded by mercury during the porosimetry measurement.

As used herein, $d_f$ is a characterization of the relative width of the distribution of pore sizes that are finer than the median pore size $d_{50}$. As used herein, $d_f$ is defined as:

$$d_f = (d_{50} - d_{10})/d_{50}$$

where $d_{50}$ and $d_{10}$ are as defined hereinabove. In the embodiments described herein, the pore size distribution of the open interconnected porosity of the porous walls of the fired porous ceramic honeycomb article is relatively narrow such that $d_f \le 0.4$, $d_f \le 0.35$, $d_f \le 0.3$, $d_f \le 0.25$, or even $d_f \le 0.2$. In some embodiments, the pore size distribution of the fired porous ceramic honeycomb articles is such that $d_f \le 0.19$.

In the embodiments described herein, the fired porous ceramic honeycomb article has a pore size distribution with a $d_{90}$ value of less than or equal to 25 microns or even less than or equal to 20 microns. Some embodiments of the fired porous ceramic honeycomb articles have a pore size distribution with a $d_{90}$ value of less than or equal to 18 microns. The quantity $d_{90}$, as used herein, is the pore diameter at which 90% of the pore volume is comprised of pores whose diameters are smaller than the value of $d_{90}$; thus, using mercury porosimetry techniques to measure porosity, $d_{90}$ is equal to the pore diameter at which 10% by volume of the open porosity of the ceramic has been intruded by mercury during the porosimetry measurement.

The ultra narrow pore size distribution of the fired porous ceramic honeycomb articles may also be characterized by the width $d_b$ of the distribution of pore sizes that are both finer and coarser that he median pore size $d_{50}$. As used herein, $d_b$ is defined as:

$$d_b = (d_{90} - d_{10})/d_{50},$$

where $d_{10}$, $d_{50}$ and $d_{90}$ are as defined hereinabove. The fired porous ceramic honeycomb articles described herein may have pore size distribution exhibiting a $d_b \le 1.5$ or even $d_b \le 1.2$. In some embodiments, the fired porous ceramic honeycomb articles have a pore size distribution exhibiting a $d_b \le 1.0$. In ultra narrow pore size distribution embodiments of the fired porous ceramic honeycomb articles, $d_b \le 0.8$.

In the embodiments described herein, the combined properties of the total porosity, the surface porosity, the median pore diameter $d_{50}$ and the d factor $d_f$ generally provide a fired porous ceramic honeycomb article with a relatively high initial filtration efficiency (FE$_0$) of greater than or equal to 50% or even greater than or equal to 60%. In some embodiments of the fired porous ceramic honeycomb articles described herein, the initial filtration efficiency (FE$_0$) is greater than or equal to 70% or even greater than or equal to 90%.

EXAMPLES

To further illustrate the principles of the microcracked porous ceramic honeycomb articles described herein, the following examples are offered to illustrate specific embodiments of the microcracked porous ceramic honeycomb articles described above and the methods for producing the same. It should be understood that the following examples are for purposes of description only and are not intended to limit the scope of the claimed subject matter.

Numerous exemplary embodiments of microcracked porous ceramic honeycomb articles have been produced using various combinations of constituent materials including talc, kaolin clay, alumina-forming sources, silica-forming sources and processing aids including, without limitation, binders, pore formers, liquid vehicles and lubricants. The composition of various exemplary embodiments are set forth in Table 1. The corresponding LMC properties of the compositions are set forth in Tables 2. The post-microcracking properties of some representative examples are set forth in Table 3.

It should be understood that the embodiments of the porous ceramic honeycomb articles described herein generally represent a departure from the general direction of development of cordierite porous ceramic honeycomb articles. Specifically, the embodiments described herein are initially formed and fired to produce porous ceramic honeycomb articles which initially have very few microcracks (i.e., the article has a low microcracking parameter $Nb^3$) and relatively higher CTEs. Thereafter, the porous ceramic honeycomb articles may be coated with a washcoating after which the porous ceramic honeycomb articles are exposed to a microcracking condition to intentionally increase the amount of microcracking (i.e., increase the microcracking parameter $Nb^3$ of the article) thereby lowering the CTE of the porous ceramic honeycomb articles and improving the ability of the articles to withstand thermal shock.

In addition, the porous ceramic honeycomb articles described herein have a higher porosity and lower median pore diameter with an ultra-narrow pore size distribution which results in a relatively low backpressure drop in both clean and soot loaded conditions. Also, the porous ceramic articles described herein exhibit a high filtration efficiency, particularly a relatively high initial filtration efficiency.

In particular, the fired porous ceramic honeycomb articles comprise a primary cordierite composition consisting of, on an oxide weight percent basis, from about 49% to about 53% by weight $SiO_2$, from about 33% to about 38% by weight $Al_2O_3$, and from about 12% to about 16% by weight MgO, as measured by x-ray diffraction.

The cordierite precursor batch compositions utilized to form the porous ceramic honeycomb articles are listed in Table 1. The alumina forming source utilized in Example 1 had a mean particle diameter of approximately 7 microns. The alumina forming source utilized in Examples 2, 3, and 5 had a mean particle diameter of approximately 4 microns and a narrower particle size distribution than the alumina forming source utilized in Example 1. Example 4 contained an alumina forming source having a mean particle diameter of approximately 4.5 microns. All the exemplary cordierite precursor batch compositions utilized cross-linked corn starch as the pore former.

The cordierite precursor batch compositions contained in Table 1 below were fired to produce initially low microcracked porous ceramic honeycomb articles having the microstructure and properties described hereinabove. Specifically, the cordierite precursor batch compositions were fired by heating green honeycomb articles in a furnace from room temperature to about 1200° C. with a ramp rate between about 20° C./hr and about 70° C./hr. Thereafter, the green honeycomb articles were rapidly heated from 1200° C. to a soaking temperature of 1425° C. at a ramp rate of 75° C./hr. The green honeycomb articles were held at the soak temperature for 10 hours to produce the primary cordierite crystalline phase described above. After firing, the porous ceramic honeycomb articles had a low $Nb^3$ parameter and, as such, were considered low microcracked (LMC) porous ceramic honeycomb articles.

The resulting LMC porous ceramic honeycomb articles were then evaluated to determine their physical properties including CTE, porosity (both total porosity and surface porosity), pore size distribution (including $d_{10}$, $d_{50}$, $d_{90}$, and $d_f$), modulus of rupture (MOR) at room temperature, modulus of elasticity ($E_{mod}$) at room temperature, strain tolerance (MOR/$E_{mod}$), Thermal Shock Limit (TSL), and Thermal Shocking Parameter (TSP). CTE was measured by dilatometry in the axial direction (parallel to the cell channels). All measurements of pore microstructure were made by mercury porosimetry using an Autopore IV 9520 by Micrometrics. Elastic modulus was measured on a cellular bar in the axial direction using a sonic resonance technique. MOR was measured using the four point bend method in the axial direction of a rectangular cellular bar having dimensions of 4×1×0.5 inches. The test results are reported in Table 2 below.

TABLE 1

Cordierite Precursor Batch Compositions

| | Example | | | | |
|---|---|---|---|---|---|
| | Ex. 1 | Ex. 2 | Ex. 3 | Ex. 4 | Ex. 5 |
| Talc (%) | 41.54 | 41.54 | 41.54 | 41.54 | 41.54 |
| Silica (%) | 16.59 | 16.59 | 22.41 | 16.59 | 16.59 |
| Clay (%) | 13.85 | 13.85 | 0 | 13.85 | 13.85 |
| Alumina (%) | 27.93 | 27.93 | 34.15 | 27.93 | 27.93 |
| Pore Former (%) | 20 | 20 | 20 | 25 | 25 |
| Binder (%) | 7 | 7 | 7 | 7 | 7 |
| Lubricant (%) | 1 | 1 | 1 | 1 | 1 |

TABLE 2

Low-Microcracking (LMC) Properties

| | Example | | | | |
|---|---|---|---|---|---|
| | Ex. 1 | Ex. 2 | Ex. 3 | Ex. 4 | Ex. 5 |
| Cell Geometry | 200/10 | 200/10 | 200/10 | 200/10 | 200/10 |
| Total Porosity (% P) | 55.1 | 56.3 | 54.5 | 55.2 | 58.1 |
| Surface Porosity (% P) | 37.0 | 37.4 | 33.2 | 41.9 | 38.9 |
| Surface porosity/total porosity | 0.67 | 0.66 | 0.61 | 0.76 | 0.67 |
| $d_{50}$ (um) | 13.3 | 10.4 | 9.3 | 9.5 | 11.3 |
| $d_{10}$ (um) | 10.2 | 7.8 | 7.1 | 7.7 | 8.7 |
| $d_{90}$ (um) | 23.2 | 13.8 | 14.8 | 12.8 | 15.8 |
| $d_f$ | 0.23 | 0.25 | 0.23 | 0.19 | 0.23 |
| CTE ($\times 10^{-7}$/° C.) | 14.1 | 12.0 | 11.0 | 13.0 | 12.3 |
| MOR (psi) | 439 | 466 | 439 | 579 | 509 |
| $E_{mod}$ (Mpsi) | 0.39 | 0.45 | 0.46 | 0.49 | 0.42 |
| $Nb^3$ | 0.12 | 0.14 | 0.14 | 0.11 | 0.08 |
| Strain Tolerance-RT (%) | 0.113 | 0.104 | 0.095 | 0.118 | 0.121 |
| TSL (° C.) | 1047 | 1030 | 1024 | 1092 | 1081 |

Following firing, some of the LMC porous ceramic honeycomb articles were exposed to a microcracking condition. More specifically, the LMC porous ceramic honeycomb articles were exposed to a thermal cycle that included heating the LMC porous ceramic honeycomb articles to a peak temperature of 600° C. and cooling the articles to room temperature at a rate of at least 200° C. to produce microcracked (MC) porous ceramic honeycomb articles.

The resulting MC porous ceramic honeycomb articles were then evaluated to determine their physical properties including CTE, modulus of rupture (MOR) at room temperature, modulus of elasticity ($E_{mod}$) at room temperature, strain tolerance (MOR/$E_{mod}$), and Thermal Shock Limit (TSL). CTE was measured by dilatometry in the axial direction (parallel to the cell channels). Elastic modulus was measured on a cellular bar in the axial direction using a sonic resonance technique. MOR was measured using the four point bend method in the axial direction of a rectangular cellular bar having dimensions of 4×1×0.5 inches. The test results are reported in Table 3 below.

TABLE 3

Post-Microcracking Properties

| | Example | | | | |
|---|---|---|---|---|---|
| | Ex. 1 | Ex. 2 | Ex. 3 | Ex. 4 | Ex. 5 |
| Cell Geometry | 200/10 | 200/10 | 200/10 | 200/10 | 200/10 |
| CTE ($\times 10^{-7}$/° C.) | 8.0 | 6.5 | 6.0 | 7.5 | 6.2 |
| MOR (psi) | 250 | 280 | 250 | 344 | 290 |
| $E_{mod}$ (Mpsi) | 0.29 | 0.33 | 0.33 | 0.35 | 0.31 |
| $Nb^3$ | 0.25 | 0.30 | 0.26 | 0.22 | 0.16 |
| Strain Tolerance-RT (%) | 0.086 | 0.085 | 0.076 | 0.098 | 0.094 |
| TSL (° C.) | 1120 | 1130 | 1100 | 1160 | 1180 |

The data contained in Table 3 indicate that, following exposure to the microcracking condition, the exemplary MC porous ceramic honeycomb article embodiments have a relatively low CTE in the range from about $1.0 \times 10^{-7}$/° C. to about $10.0 \times 10^{-7}$/° C. over from about 25° C. to about 800° C. The data also indicate that the microcracking parameter $Nb^3$ of the exemplary porous ceramic honeycomb articles is generally at least 20% greater than the corresponding LMC porous ceramic honeycomb articles. The TSL of the MC porous ceramic honeycomb articles was 1100° C. or greater following exposure to the microcracking condition which is greater than the corresponding LMC porous ceramic honeycomb articles. The data also indicates that the MOR of the exemplary porous ceramic honeycomb articles is generally greater than about 200 psi following exposure to the microcracking condition. The data further indicate that the $E_{mod}$ for porous ceramic honeycomb articles with a 200/10 geometry is generally greater than about 0.29 Mpsi following exposure to the microcracking condition.

The data contained in Tables 2 and 3 also indicate that the cordierite precursor batch compositions of Tables 1 may be used to produce porous ceramic honeycomb articles having a unique combination of microstructure properties, as described herein. More specifically, the exemplary porous ceramic honeycomb articles described herein have relatively high porosity with a relatively low median pore diameter and a relatively narrow pore size distribution which yields porous ceramic honeycomb articles with relatively low backpressure drops in both the loaded and the unloaded conditions. The corresponding MC porous ceramic honeycomb articles have similar microstructure characteristics.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A porous ceramic honeycomb article, comprising:
a fired cordierite body having an as-fired microcrack parameter ($Nb^3$) of from 0.08 to about 0.25, wherein, when the fired cordierite body is exposed to an acid wash, the fired cordierite body comprises an acid wash-induced microcrack parameter ($Nb^3$) that is at least 20% greater than the as-fired microcrack parameter.

2. The porous ceramic honeycomb article of claim 1, wherein the fired cordierite body further comprises an as-fired coefficient of thermal expansion (CTE) of from about $7.0 \times 10^{-7}$/° C. to about $15.0 \times 10^{-7}$/° C. over from about 25° C. to about 800° C., and an acid wash-induced coefficient of thermal expansion of from about $1.0 \times 10^{-7}$/° C. to about $10.0 \times 10^{-7}$/° C. over from about 25° C. to about 800° C.

3. The porous ceramic honeycomb article of claim 1, wherein the fired cordierite body further comprises an as-fired and an acid wash-induced surface porosity of from about 38% to about 45%.

4. The porous ceramic honeycomb article of claim 1, wherein the fired cordierite body is manufactured from a batch of inorganic components including talc having $d_{pt50} \leq 10$ µm, a silica-forming source having $d_{ps50} \leq 20$ µm, an alumina-forming source having a median particle diameter $d_{pa50}$ of less than or equal to 10.0 µm, and a pore former having $d_{pp50} \leq 20$ µm, wherein $d_{pp50}$ is a median particle diameter of the pore former, $d_{ps50}$ is a median particle diameter of the silica-forming source, $d_{pa50}$ is a median particle diameter of the alumina-forming source, and $d_{pt50}$ is a median particle diameter of the talc.

5. A porous ceramic honeycomb article, comprising:
a fired cordierite body having an as-fired microcrack parameter ($Nb^3$) of from 0.08 to about 0.25, an as-fired coefficient of thermal expansion (CTE) of from about $7.0 \times 10^{-7}$/° C. to about $15.0 \times 10^{-7}$/° C. over from about 25° C. to about 800° C., an as-fired $d_f$ of less than or equal to about 0.3, wherein $d_f=(d_{50}-d_{10})/d_{50}$, an as-fired $d_b$ of less than or equal to about 1.5, wherein $d_b=(d_{90}-d_{10})/d_{50}$,
wherein, when the fired cordierite body is exposed to an acid wash, the fired cordierite body comprises an acid wash-induced microcrack parameter ($Nb^3$) that is at least 20% greater than the as-fired microcrack parameter, an acid wash-induced coefficient of thermal expansion (CTE) of from about $1.0 \times 10^{-7}$/° C. to about $10.0 \times 10^{-7}$/° C. over from about 25° C. to about 800° C., an acid wash-induced $d_f$ of less than or equal to about 0.3, and an acid wash-induced $d_b$ of less than or equal to about 1.5, wherein $d_b=(d_{90}-d_{10})/d_{50}$.

6. The porous ceramic honeycomb article of claim 5, wherein the fired cordierite body further comprises an as-fired and an acid wash-induced $d_f$ of less than or equal to about 0.2.

7. The porous ceramic honeycomb article of claim 5, wherein the fired cordierite body further comprises an as-fired and an acid wash-induced surface porosity of from about 38% to about 45%.

8. The porous ceramic honeycomb article of claim 5, wherein the fired cordierite body further comprises an as-fired and an acid wash-induced total porosity (% P) of from about 50% to about 70%.

9. The porous ceramic honeycomb article of claim 5, wherein the fired cordierite body further comprises an as-fired and an acid wash-induced surface porosity/total porosity ratio of greater than about 0.5.

10. The porous ceramic honeycomb article of claim 5, wherein the fired cordierite body further comprises an as-fired and an acid wash-induced mean pore size ($d_{50}$) of from about 7 µm to about 16 µm.

11. The porous ceramic honeycomb article of claim 5, wherein the fired cordierite body further comprises an acid wash-induced thermal shock limit of greater than 1000° C.

12. The porous ceramic honeycomb article of claim 5, wherein the fired cordierite body has a 200/10 geometry and further comprises an as-fired modulus of rupture strength (MOR) of greater than about 300 psi, and an acid wash-induced modulus of rupture strength of greater than about 200 psi.

13. The porous ceramic honeycomb article of claim 5, wherein the fired cordierite body has a 200/10 geometry and further comprises an as-fired elastic modulus ($E_{mod}$) of greater than about $3.0\times10^5$ psi, and an acid wash-induced elastic modulus of greater than about $2.0\times10^5$ psi.

14. The porous ceramic honeycomb article of claim 5, wherein the fired cordierite body is manufactured from a batch of inorganic components including talc having $d_{pt50} \leq 10$ µm, a silica-forming source having $d_{ps50} \leq 20$ µm, an alumina-forming source having a median particle diameter $d_{pa50}$ of less than or equal to 10.0 µm, and a pore former having $d_{pp50} \leq 20$ µm, wherein $d_{pp50}$ is a median particle diameter of the pore former, $d_{ps50}$ is a median particle diameter of the silica-forming source, $d_{pa50}$ is a median particle diameter of the alumina-forming source, and $d_{pt50}$ is a median particle diameter of the talc.

15. A porous ceramic honeycomb article, comprising:
a fired cordierite body having an as-fired microcrack parameter ($Nb^3$) of from 0.08 to about 0.25, an as-fired coefficient of thermal expansion (CTE) of from about $7.0\times10^{-7}$/° C. to about $15.0\times10^{-7}$/° C. over from about 25° C. to about 800° C., an as-fired surface porosity of from about 38% to about 45%,
wherein, when the fired cordierite body is exposed to an acid wash, the fired cordierite body comprises an acid wash-induced microcrack parameter ($Nb^3$) that is at least 20% greater than the as-fired microcrack parameter, an acid wash-induced coefficient of thermal expansion (CTE) of from about $1.0\times10^{-7}$/° C. to about $10.0\times10^{-7}$/° C. over from about 25° C. to about 800° C., and an acid wash-induced surface porosity of from about 38% to about 45%, wherein
the fired cordierite body further comprises an as-fired and an acid wash-induced $d_f$ of less than or equal to about 0.3, wherein $d_f=(d_{50}-d_{10})/d_{50}$, and
the fired cordierite body further comprises an as-fired and an acid wash-induced $d_b$ of less than or equal to about 1.5, wherein $d_b=(d_{90}-d_{10})/d_{50}$.

16. The porous ceramic honeycomb article of claim 1, wherein the fired cordierite body further comprises an as-fired and an acid wash-induced $d_b$ of less than or equal to about 1.2.

17. The porous ceramic honeycomb article of claim 5, wherein the fired cordierite body further comprises an as-fired and an acid wash-induced $d_b$ of less than or equal to about 1.2.

18. The porous ceramic honeycomb article of claim 15, wherein the fired cordierite body further comprises an as-fired and an acid wash-induced $d_b$ of less than or equal to about 1.2.

19. The porous ceramic honeycomb article of claim 1, wherein
the fired cordierite body further comprises an as-fired and an acid wash-induced $d_f$ of less than or equal to about 0.3, wherein $d_f=(d_{50}-d_{10})/d_{50}$, and
the fired cordierite body further comprises an as-fired and an acid wash-induced $d_b$ of less than or equal to about 1.5, wherein $d_b=(d_{90}-d_{10})/d_{50}$.

* * * * *

UNITED STATES PATENT AND TRADEMARK OFFICE
CERTIFICATE OF CORRECTION

PATENT NO. : 9,856,177 B2
APPLICATION NO. : 12/789833
DATED : January 2, 2018
INVENTOR(S) : Weiguo Miao et al.

It is certified that error appears in the above-identified patent and that said Letters Patent is hereby corrected as shown below:

On page 2, Column 2, item (56), U.S. PATENT DOCUMENTS, Line 30, delete "Backharicoult et al." and insert -- Backhaus-Ricoult et al. --.

Signed and Sealed this
Third Day of March, 2020

Andrei Iancu
*Director of the United States Patent and Trademark Office*